Patented Jan. 6, 1925.

1,522,176

UNITED STATES PATENT OFFICE.

GEORGE WASHINGTON CARVER, OF TUSKEGEE, ALABAMA.

COSMETIC AND PROCESS OF PRODUCING THE SAME.

No Drawing.   Application filed September 17, 1923.   Serial No. 663,302.

*To all whom it may concern:*

Be it known that I, GEORGE WASHINGTON CARVER, a citizen of the United States, residing at Tuskegee, in the county of Macon and State of Alabama, have invented certain new and useful Improvements in Cosmetics and Processes of Producing the Same, of which the following is a specification.

The invention relates to cosmetics and has as an object the provision of a pomade or cream made from peanuts. A further object of the invention is the provision of a process for making a pomade from peanuts which will provide a "vanishing cream" of any desired or usual tint, the pomade or cream having powder combined therewith. To carry out the process, the peanuts may be utilized in their raw, boiled or blanched condition and are first ground or macerated in any desired manner to the fineness of peanut butter. If for any reason a granular pomade is desired the grinding of the peanuts is carried out only to the extent necessary to give the character desired to the finished product. When ground to the fineness of peanut butter as suggested the resulting product will be a perfectly smooth substance.

To the ground or macerated nuts taking as a basis one ounce of peanuts there is next added 100 c. c. of pure water either hot or cold which is well stirred in with the ground nuts.

The resulting mixture is then strained through a piece of cheese cloth with gentle pressure and is put on the stove or water bath and evaporated until the oil becomes plainly visible on the surface.

The resulting product may be used unmodified in the subsequent steps or 2 c. c. of peanut oil may be added and the entire mass stirred until it becomes of the consistency of thick cream.

The material is then removed from the fire and approximately six grams of toilet powder such as kaolin, kaolinite, or china clay (preferably having slight fuller's earth properties) is added and the combined mass is thoroughly mixed until it becomes a thick heavy cream.

A quantity of salicylic acid substantially the size of a small pea, 10 drops of benzoin, and three or four drops of any desired perfume are then added. The mass thus obtained is finally ground or macerated until absolutely smooth, if the smooth product is desired, and the product is packed in porcelain, or glass containers.

If desired the above process may be modified by omitting either the added peanut oil, or the toilet powders, or both. By proper choice of the toilet powder any desired color may be given the product, from the dark brunette shades through the pinks, lavenders, to pure white.

I claim:—

1. The process of producing a cosmetic which comprises reducing peanuts to a finely divided condition, diluting the product with water reducing the mass to a consistency of thick cream and adding a preservative thereto.

2. The process of producing a cosmetic which comprises reducing peanuts to a finely divided condition, adding peanut oil and a preservative thereto and reducing the mass to a consistency of thick cream.

3. The process of producing a cosmetic which comprises reducing peanuts to a finely divided condition, diluting the product, adding toilet powder and a preservative thereto and reducing the mass to a consistency of thick cream.

4. The process of producing a cosmetic which comprises reducing peanuts to a finely divided condition, diluting with water, heating the mixture, adding peanut oil and a preservative and reducing the mass to a consistency of thick cream.

5. The process of producing cosmetics which comprises reducing peanuts to a finely divided condition, diluting the product, evaporating until oil appears upon the surface, adding peanut oil, toilet powder and a preservative.

6. The process of producing cosmetics which comprises reducing peanuts to a finely divided condition, diluting the product, straining the diluted mass, evaporating until oil appears upon the surface, adding peanut oil, stirring toilet powder into the mass, adding a preservative and a perfume and macerating until smooth.

7. The process of producing a cosmetic which comprises reducing peanuts to a finely divided condition, diluting with water, straining, evaporating until oil appears upon the surface, adding peanut oil, stirring a clay toilet powder into the mixture, adding a preservative and a perfume and macerating the resulting product until smooth.

8. A cosmetic comprising a homogeneous creamy paste of peanuts and water.

9. A cosmetic comprising a homogeneous paste of ground cooked peanuts, peanut oil, and a preservative.

10. A cosmetic comprising ground cooked peanuts, peanut oil, toilet powder and a preservative.

11. A cosmetic comprising ground and cooked peanuts, peanut oil, finely divided clay, a preservative and a perfume.

GEORGE WASHINGTON CARVER.